(12) United States Patent
Hwang et al.

(10) Patent No.: US 6,195,405 B1
(45) Date of Patent: Feb. 27, 2001

(54) GAP STRUCTURE FOR NUCLEAR REACTOR VESSEL

(76) Inventors: Il Soon Hwang, Seoul National University, Apt. Ka-106, Bongchun-dong, Kwanak-ku, Seoul 151-050; Kune Yull Suh, Hanyang Apt. 10-1003, Abkujung-dong, Kangnam-ku, Seoul 135-110; Kwang Jin Jeong, Jang-Mi Apt. 2-1205, Shinchun-dong, Songpa-ku, Seoul 138-240; Sang Deok Park, Samsung Pooren Apt. 108-1205, Jeonmin-dong, Yousung-ku, Daejeon 305-390; Dong Cheol Lim, Doma-1-dong 142-3, Suh-ku, Daejeon 302-161, all of (KR)

( * ) Notice: Subject to any disclaimer, the term of this patent is extended or adjusted under 35 U.S.C. 154(b) by 0 days.

(21) Appl. No.: 09/202,982
(22) PCT Filed: Sep. 25, 1996
(86) PCT No.: PCT/KR96/00166
§ 371 Date: Jan. 26, 1999
§ 102(e) Date: Jan. 26, 1999
(87) PCT Pub. No.: WO98/13832
PCT Pub. Date: Apr. 2, 1998
(51) Int. Cl.[7] .............................. G21C 9/00; G21C 9/016
(52) U.S. Cl. ......................... 376/280; 376/282; 376/287
(58) Field of Search ................................... 376/280, 294, 376/298, 299

(56) References Cited

U.S. PATENT DOCUMENTS

| | | | |
|---|---|---|---|
| 4,036,688 | * 7/1977 | Golden et al. | 176/38 |
| 4,072,561 | * 2/1978 | Friedrich | 176/38 |
| 4,113,560 | 9/1978 | Driscoll . | |
| 4,280,872 | 7/1981 | Ferrari . | |
| 4,310,385 | * 1/1982 | Rosewell | 376/280 |
| 4,412,969 | 11/1983 | Tilbrook . | |
| 4,442,065 | 4/1984 | Latter . | |
| 4,859,402 | * 8/1989 | Tupper et al. | 376/285 |
| 5,263,066 | 11/1993 | Szabo . | |

FOREIGN PATENT DOCUMENTS 0 563 739 10/1993 (EP) .
2 236 210 3/1991 (GB) .

OTHER PUBLICATIONS

Suh et al, The SONATA–IV Project, Apr. 1996, pp. 841–853.

* cited by examiner

Primary Examiner—Charles T. Jordan
Assistant Examiner—Kyongtack K. Mun
(74) Attorney, Agent, or Firm—Nixon & Vanderhye P.C.

(57) ABSTRACT

A gap forming structure for use with water cooled nuclear reactors is invented to prevent overheating and ultimately structurally failing of the lower head of a reactor vessel in a nuclear reactor core meltdown accident by virtue of a cooling effect in the gap structure for facilitating the retention of accumulated molten core debris. Single layer or multilayer gap structures can be installed either inside or outside the vessel lower head by joining, or fastening structures or secured to the instruments/control guide tubes within the vessel. The water cooling capacity inside the gap can prevent the vessel lower head from overheating and subsequently failing and thus defend against severe accidents by preventing the lower head of the reactor vessel from rupturing.

6 Claims, 11 Drawing Sheets

GAP STRUCTURE FOR NUCLEAR REACTOR VESSEL

TECHNICAL FIELD

This invention relates to a gap forming and retention structures for protection of the nuclear reactor vessel lower head from rupture in core meltdown accident.

BACKGROUND ART

This invention, concerned with nuclear reactors, is to introduce at the lower head of the reactor vessel a gap forming structure by which a coolable geometry is maintained to prevent overheating and ultimately failing of the lower head wall due to accumulated molten core debris in the event of a core meltdown accident. The lower head herein refers to a concave paraboloidal or cylindrical vessel that comprises as the reactor fluid boundary. Should such a severe accident occur, the core material inside the reactor vessel may melt due to overheating and then relocate down to the vessel lower head. In this event, direct contact by the vessel lower head with molten core material may heat up and deform the metallic reactor vessel lower head causing it to rupture, thereby posing a risk of massive release of radioactive materials. The structure of this invention creates an engineered gap which prevents the molten core material from directly contacting the vessel inner surface such that: firstly, it prevents rapid heating of the reactor vessel lower head; secondly, it helps achieve a defense against severe accidents by the secured water cooling effect inside the gap and hence prevents the reactor vessel lower head from failing.

Conventional water cooled reactors do not have gap structures for protection against severe meltdown accidents. Therefore, should a severe accident occur and the molten core material relocate downward and accumulate on the vessel lower head, a minimal gap may naturally form that may possibly be too small and irregular for sufficient cooling of the debris depending on the extent of the accident. In the Three Mile Island Unit-2 (TMI-2) accident of 1979, which turned out to be a severe accident involving core meltdown, direct contact of the vessel lower head with molten core debris resulted in excessive heating of the vessel inne wall to near its melting temperature. Yet, for some unexplained mechanisms, the vessel was subsequently, cooled to avoid vessel failure. To explain the rapid cooling, it is theorized that limited water cooling was achieved inside a gap formed between the molten core debris and the inner surface of the lower head, but its non-uniform and irregular configurations led to developing hot spots. In the TMI-2 accident, there remained insufficient margin separating the failure of the reactor vessel lower head despite the fact that the amount of relocated core debris of nineteen tons was not more than one-fifth of the core materials. Therefore, if a severe accident were to occur with a greater extent of melting, the cooling of the reactor vessel lower head may be inadequate with only a natural cooling mechanism and may potentially result in reactor vessel rupture followed by ejection of the molten core debris. Consequently, a large mass of high temperature materials may be released out of the vessel to trigger further chemical and thermal reactions with the structures in the containment building. This may develop into an even more severe accident by threatening the integrity of the containment by way of high pressure and temperature.

An ex-vessel catcher was proposed by M. J. Driscoll and F. L. Bowman (M. I. T.) [U.S. Pat. No. 4,113,560]. In the ex-vessel catcher, the molten core debris solidifies with ex-vessel structures (graphite, sand etc.). The ex-vessel catcher can confine and isolate molten core debris within itself to block further reaction with the containment structures. It is intended to avoid the generation of heat and gases from the reaction of the molten core debris with containment floor concrete and prevent the massive escape of radioactive molten core debris through the bottom concrete. Nevertheless this particular measure only is designed to take effect after the rupture of a reactor vessel, and much of the heat and radioactivity may nonetheless be released into the containment building, and hence, additional safety systems are required for containment building cooling and protection. In the case of a liquid metal cooled fast breeder reactor, reactor under-core catcher structures have been used. But in the Fermi-I case, a core meltdown accident was provoked by the structure when it loosened due to a design inadequacy and blocked the coolant flow. In addition, the horizontal under-core catcher design of Fermi-I and of the SUPERPHENIX will not be effective for water cooled reactors due to deteriorated cooling with boiling and bubble stagnation underneath the plate.

An ex-vessel cooling has been proposed and demonstrated for its capability to externally cool the lower head (T. G. Theofanos, C. Liu, S. Addition, S. Angelini, O. Kymaelaeinen, and T. Samassi, "In-vessel Coolability and Retention of a Core-melt," DOE/ID-10460, November 1994). The method, while it is considered to be feasible for some limited number of plants in operation or under design, has the disadvantage in that it will take significant amount of time and water resources so as to flood large volume of the reactor cavity. In addition, overflooding or untimely submergence of the vessel may impose the risk of thermal shock of the irradiation embrittled vessel beltline areas.

DISCLOSURE OF INVENTION

In a first embodiment, there is disclosed a gap forming and retention structure for use with a nuclear reactor vessel having a reactor core assembly positioned above a reactor vessel lower head and with a coolant circulating in the reactor vessel, said structure comprising:

a concave vessel positioned below said reactor core assembly proximate said reactor vessel lower head for receiving and retaining therein molten core debris from said reactor core assembly in the event of a reactor core meltdown; and means for spacing apart and maintaining said concave vessel in a spaced apart condition relative to said reactor vessel lower head such that a gap is formed and maintained between said concave vessel and said reactor vessel lower head in the event of a reactor core meltdown to enable said coolant circulating in the reactor vessel to circulate within said gap thereby preventing direct contact of said molten core debris with said reactor vessel lower head and removing heat from said molten core debris such that structural integrity of said reactor vessel lower head is maintained during the reception and retention of said molten core debris by said concave vessel.

In a second embodiment, there is disclosed a gap forming and retention structure for use with a nuclear reactor vessel having a reactor core assembly positioned above a reactor vessel lower head and with a coolant circulating in the reactor vessel, said structure comprising:

a concave vessel internally positioned below said reactor core assembly proximate said reactor vessel lower head for receiving and retaining therein molten core debris from said reactor core assembly in the event of a reactor core meltdown;

a plurality of support beams secured to said concave vessel for spacing apart and maintaining said concave vessel in a spaced apart condition relative to said reactor vessel lower head in the event of a reactor core meltdown;

a plurality of deformation limiting feet secured to said concave vessel for and maintaining structural shape of said concave vessel in the event of a reactor core meltdown, whereby said plurality of support beams and said plurality of deformation limiting feet provide and maintain a gap between said concave vessel and said reactor vessel lower head to enable, in the event of a reactor core meltdown, said coolant circulating in the reactor vessel to circulate within said gap thereby preventing direct contact of said molten core debris with said reactor vessel lower head and removing heat from said molten core debris and thereby maintaining the structural integrity of said reactor vessel lower head during the reception of said molten core debris by said concave vessel.

In a third embodiment, there is disclosed a gap forming and retention structure for use with a nuclear reactor vessel having a reactor core assembly positioned above reactor vessel lower head having an external surface and with a coolant circulating in the reactor vessel, said structure comprising:

a concave vessel externally positioned below and spaced apart from said external surface of said reactor vessel lower head;

means for spacing apart and maintaining said concave vessel in a spaced apart condition relative to said external surface of said reactor vessel lower head such that a gap is formed and maintained between said concave vessel and said external surface of said reactor vessel lower head in the event of a reactor core meltdown; and a coolant supply means for supplying coolant to said gap in the event of a reactor core meltdown to enable removal of heat from said reactor vessel lower head heated by molten core debris from said reactor core assembly in the event of a reactor core meltdown thereby maintaining structural integrity of said reactor vessel lower head during the reception and retention of said molten core debris by said reactor vessel.

The present invention is designed to incorporate structures that provide a sufficient gap which should maintain coolable geometry proximate the bottom of the reactor vessel keep it from melting. This invention can be applied to all water cooled reactors to function in a passive manner in conjunction with existing engineered safety features as well as natural circulation routes.

BRIEF DESCRIPTION OF DRAWINGS

The said advantages and other advantages of preferred embodiments of the present invention will now be more fully described in the following detailed description, taken with the accompanying drawings wherein.

BEST MODES FOR CARRYING OUT THE INVENTION

Figure 1:
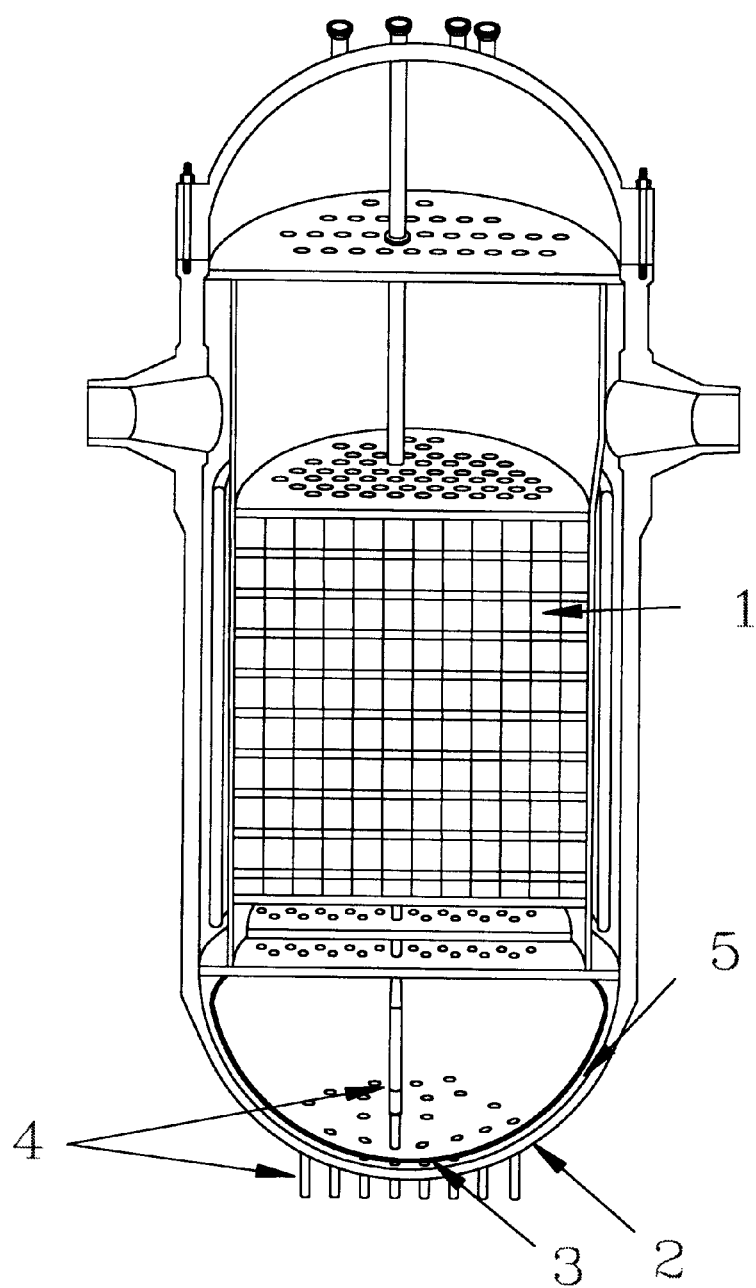
FIG. 1 shows a pressurized water reactor (PWR) vessel with a gap structure according to the present invention.
Figure 2:
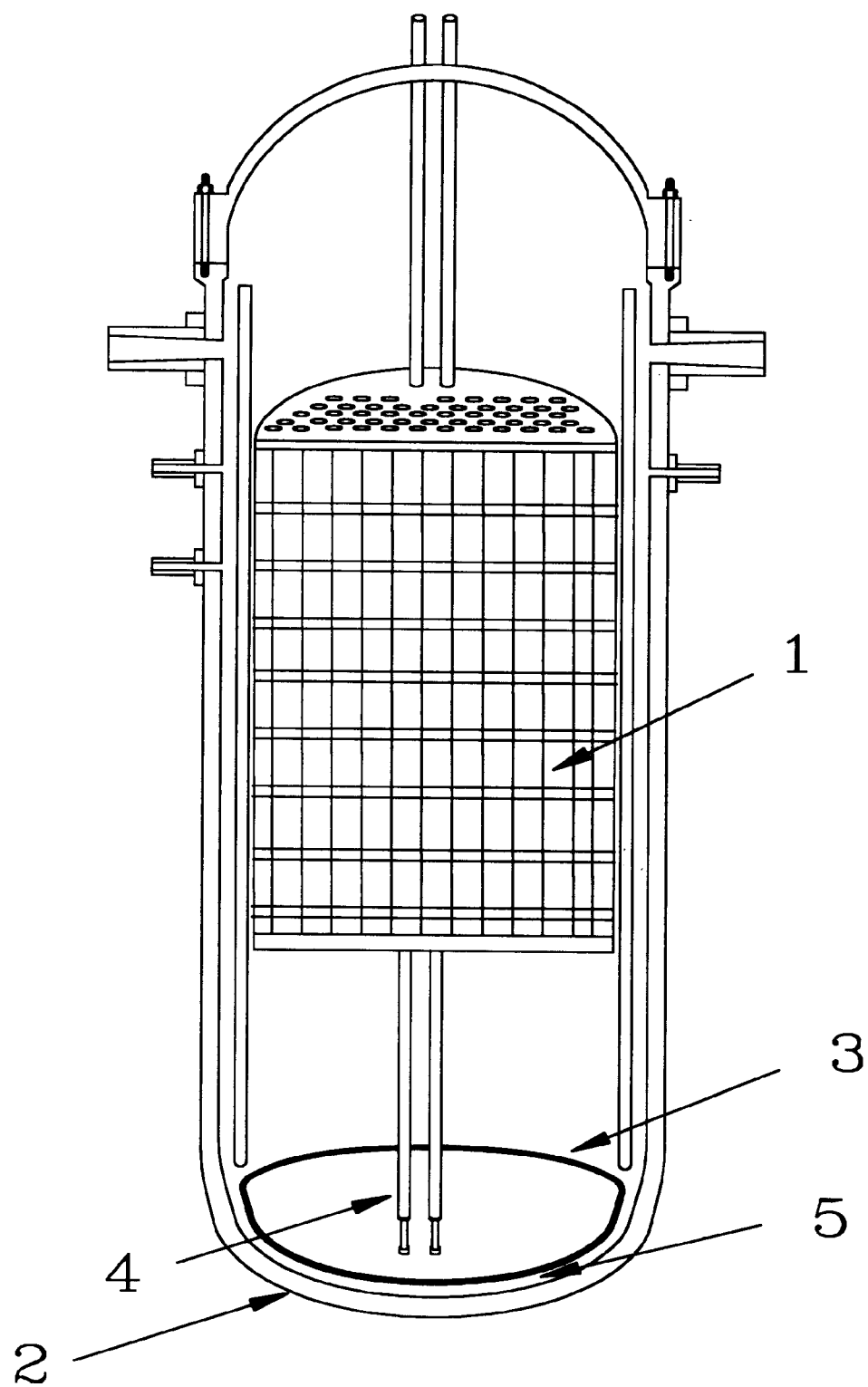
FIG. 2 shows a flow-channel type pressurized water reactor (VVER-type) vessel with a gap structure according to the present invention.
Figure 3:
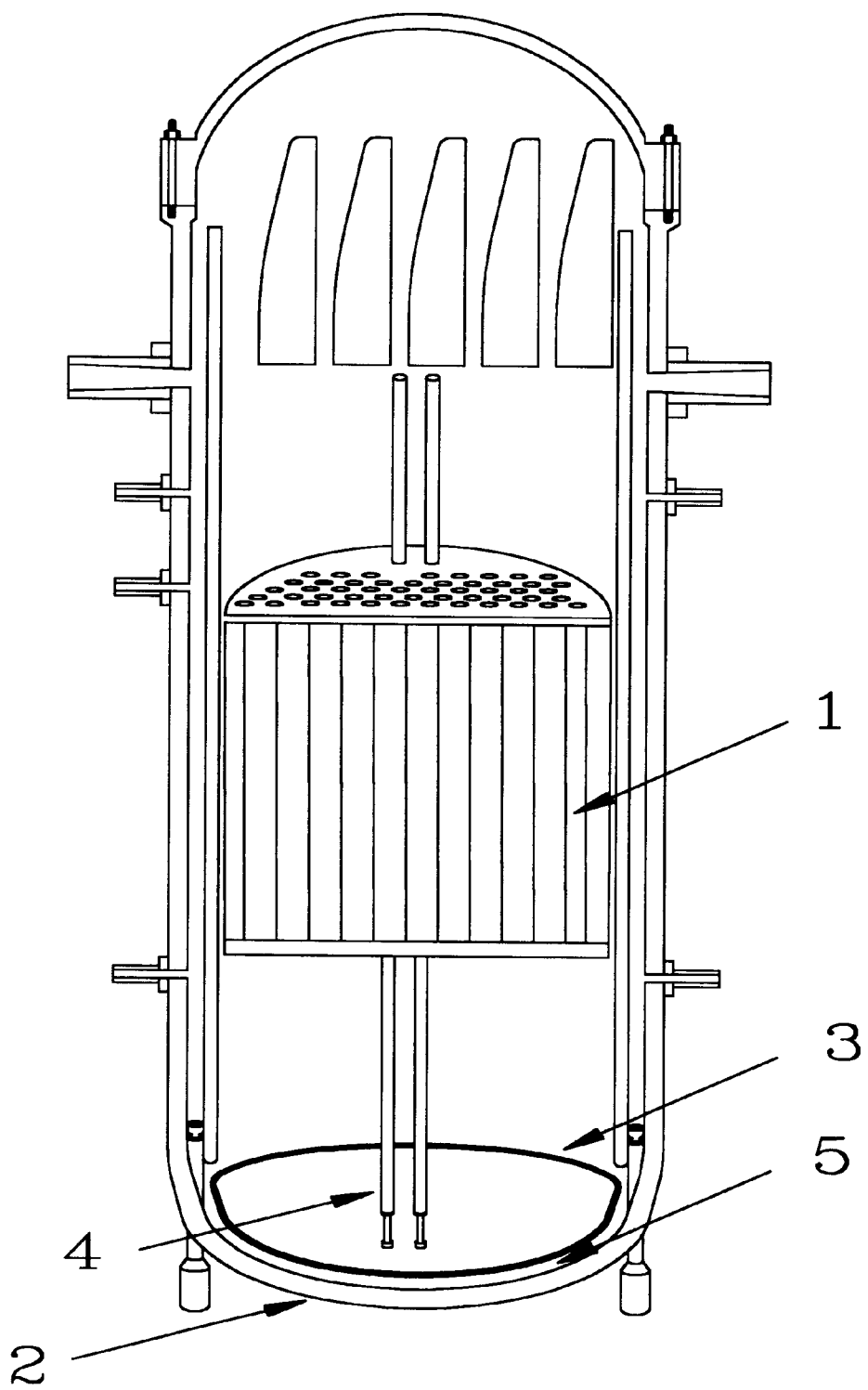
FIG. 3 shows a boiling water reactor (BWR) vessel with a gap structure according to the present invention.
Figure 4:
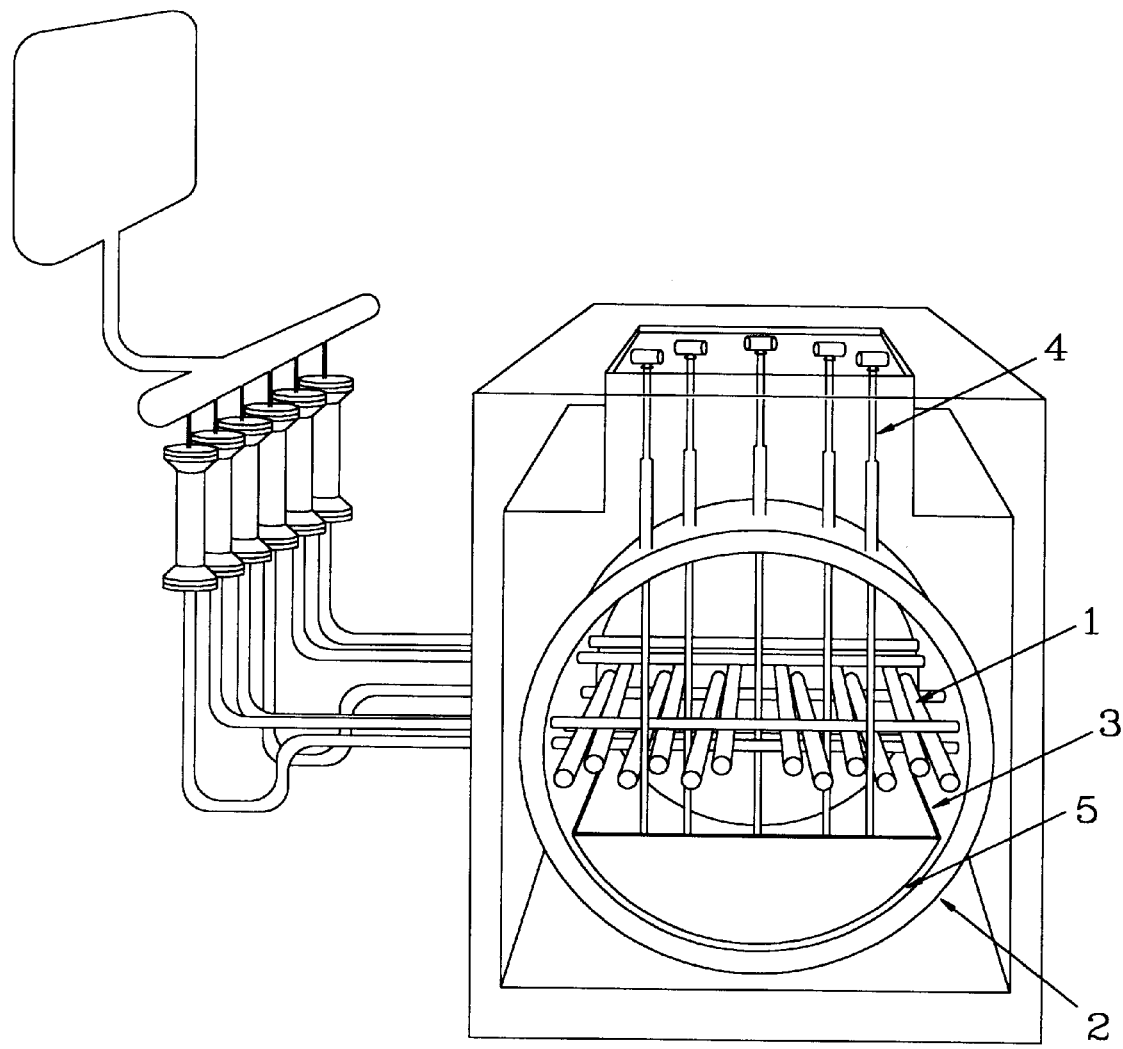
FIG. 4 shows a pressurized heavy water reactor (CANDU-type) vessel with a gap structure according to the present invention.

As shown in FIGS. 1, 2, 3, and 4, the central core (1) is a nuclear fuel region where the coolant flow removes the nuclear reaction heat. If an accident takes place and cooling capacity decreases, the core and neighboring structures may melt down and accumulate on the lower head. In this case the gap structure (3) will prevent the molten core from direct contact with the lower head (2) inner surface. In addition, instrumentation/control nozzles penetrate the reactor vessel lower head (2) and are welded to the vessel inner surface. The gap structure (3) of this invention will be installed at the bottom of the lower core support structures at an appropriate gap (5) or distance from the reactor vessel bottom and have sufficient strength and heat resistance to maintain coolable geometry and also support the dead weight of the molten core during core material meltdown accidents. The minimum gap size taking into account the boiling heat transfer and structural behaviors is determined to be about 2 centimeters. The gap structure (3) is of a parabolic or concave shape and has vertical flow holes (6). It (3) preferably covers the entire reactor vessel lower head (2) to prevent the molten core from flowing into the gap. The change of coolant flow distribution in the lower plenum due to the gap structure (3) of this invention must be minimized during normal operation or design transient of light water reactors (LWRs).

Figure 6:
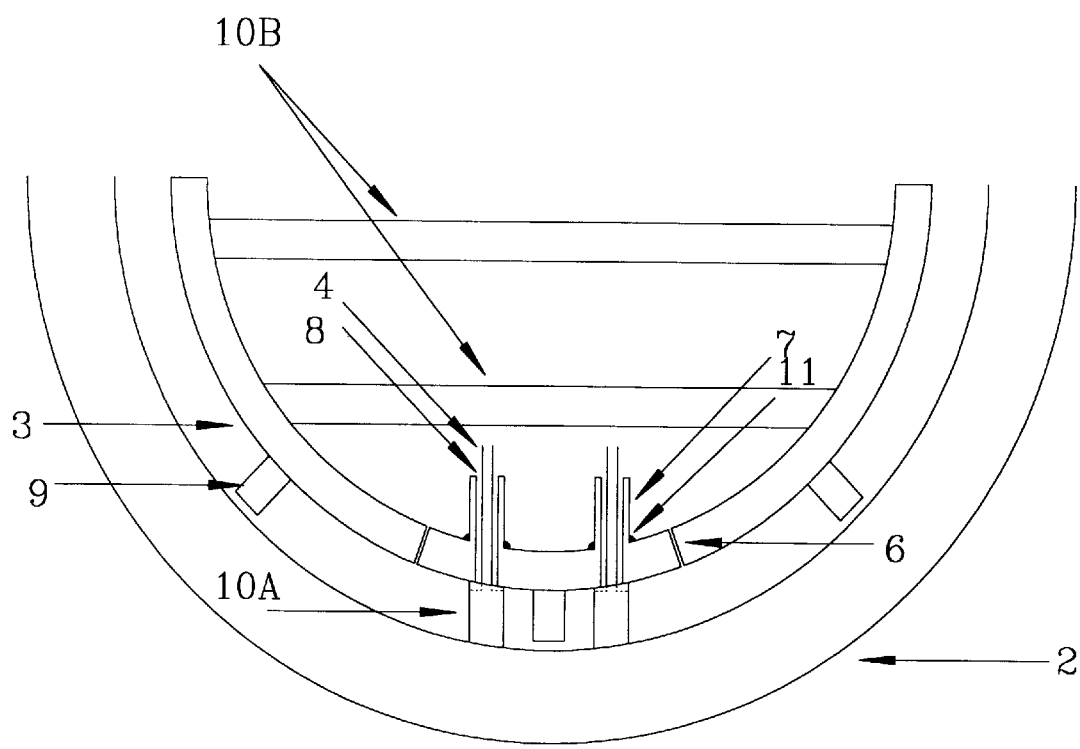
FIG. 6 shows an example of gap structure supports inside the reactor vessel lower head according to the present invention.

FIG. 6 shows that the gap structure (3) of this invention is welded (11) or fastened to the lower core structures or instrumentation/control penetration (4) structure in the vessel lower head. Additional support structure may be attached to it (3) to resist deformation induced by heavy load. The means are used for spacing apart and maintaining the concave vessel in a spaced apart condition relative to the reactor vessel lower head such that a gap is formed and maintained between the concave vessel and the reactor vessel lower head in the event of a reactor core meltdown. These means enable the coolant circulating in the reactor vessel to circulate within the gap thereby preventing direct contact of the molten core debris with the reactor vessel lower head and removing heat from the molten core debris. Such coolant circulation ensures that the structural integrity of the reactor vessel lower head is maintained during the reception and retention of the molten core debris by the concave vessel. Examples of the means for spacing apart and maintaining the concave vessel in a spaced apart condition relative to the reactor vessel lower head include support beams (10A), deformation-limiting foot (9) secured to the concave vessel and structural stiffeners (10B).

If the high temperature reactor core material melts down and accumulates in the reactor vessel lower plenum (FIG. 9), the gap structure (3) of this invention would catch the molten core material so as to avoid direct contact with the vessel and to enable removal of the heat from the relocated core material by the water coolant circulating in the gap (5) between the vessel and the debris.

Figure 5:
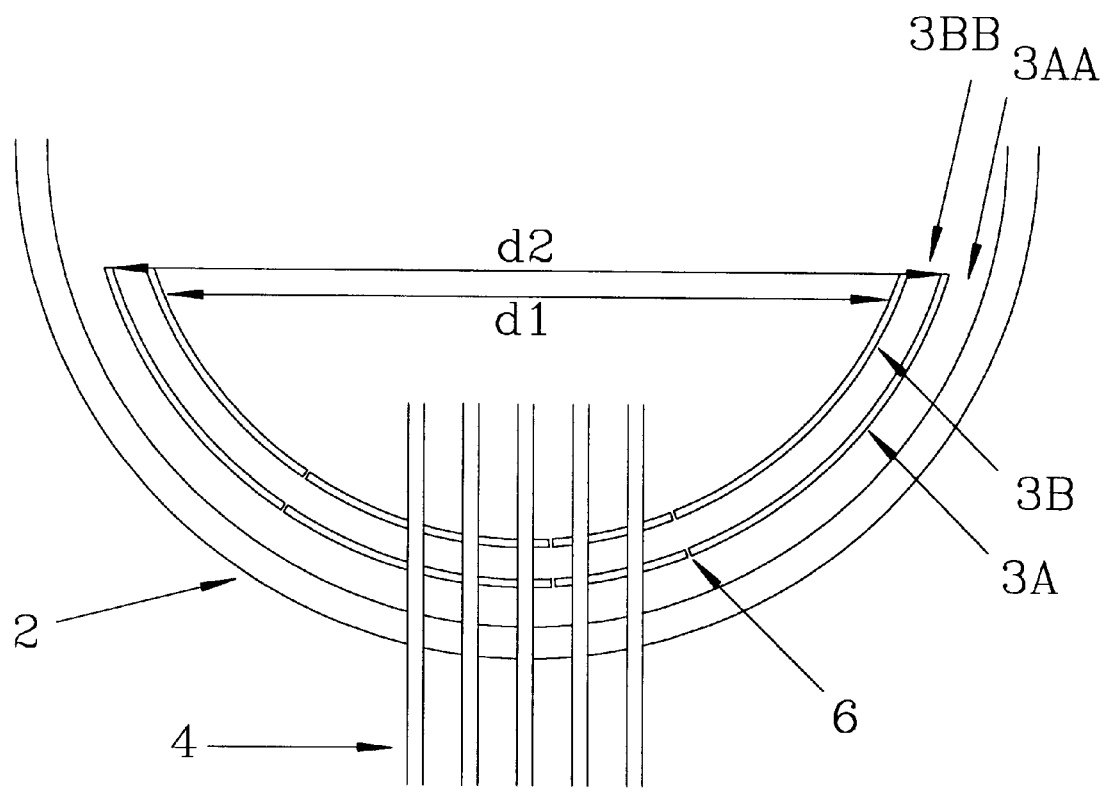
FIG. 5 shows a multilayer gap structure inside positioned at the lower head of the reactor vessel according to the present invention.

As shown in FIGS. 1, 2, 3, and 4, each gap structure (3) is illustrated in a single layer, however, multilayer gap structures may also be used where desired, as shown in FIG. 5. In this case the concave vessel of the gap forming and retention structure defines a first concave vessel (3A) and a second concave vessel (3B), wherein the first concave vessel (3A) is spaced apart from the reactor vessel lower head (2) to form a first gap (3AA) and the second concave vessel (3B) is spaced apart from the first concave vessel (3A) to form a second gap (3BB). Preferably, the diameter d1 of the second concave vessel 3B is less than the diameter d2 of the first concave vessel (3A) and the gap between vessels (3BB) and between the first concave vessel and the reactor vessel lower head (3AA) are independently uniformly or evenly spaced apart. A plurality of concave vessels may be positioned in the reactor vessel with the first being proximate the reactor vessel lower head and with the upper vessels having consecutively smaller diameters.

In FIG. 5 the first and second concave vessels (3A, 3B) are secured to the structural guide sleeves (7) which house the instrumentation/control penetration structures (4) (not illustrated). Flow holes (6) distributed in each gap structure (3) may be introduced to reduce the temperature difference between the gap water and the bulk water in the lower plenum during normal operation and design transients. The flow hole length-to-diameter ratio exceeds so that the molten core debris is not expected to penetrate through. The relocated molten core may thermally attack the instrumentation/control penetration (4) to render further diagnosis of the core state difficult. FIG. 6 shows a structural guide sleeve (7) protruding up from the gap structure to form a vertical gap (8) that will have a similar cooling effect to protect instrumentation/control penetrations. The gap structure (3) of this invention should be made of materials that are both durable and tolerant to thermal and mechanical shock loads.

Corrosion resistant metals possibly incorporating ceramic and/or composite materials would be expected to qualify for the required resistance. Cooling fins may be attached to the gap structure (3) to enhance the cooling capacity.

Figure 7:
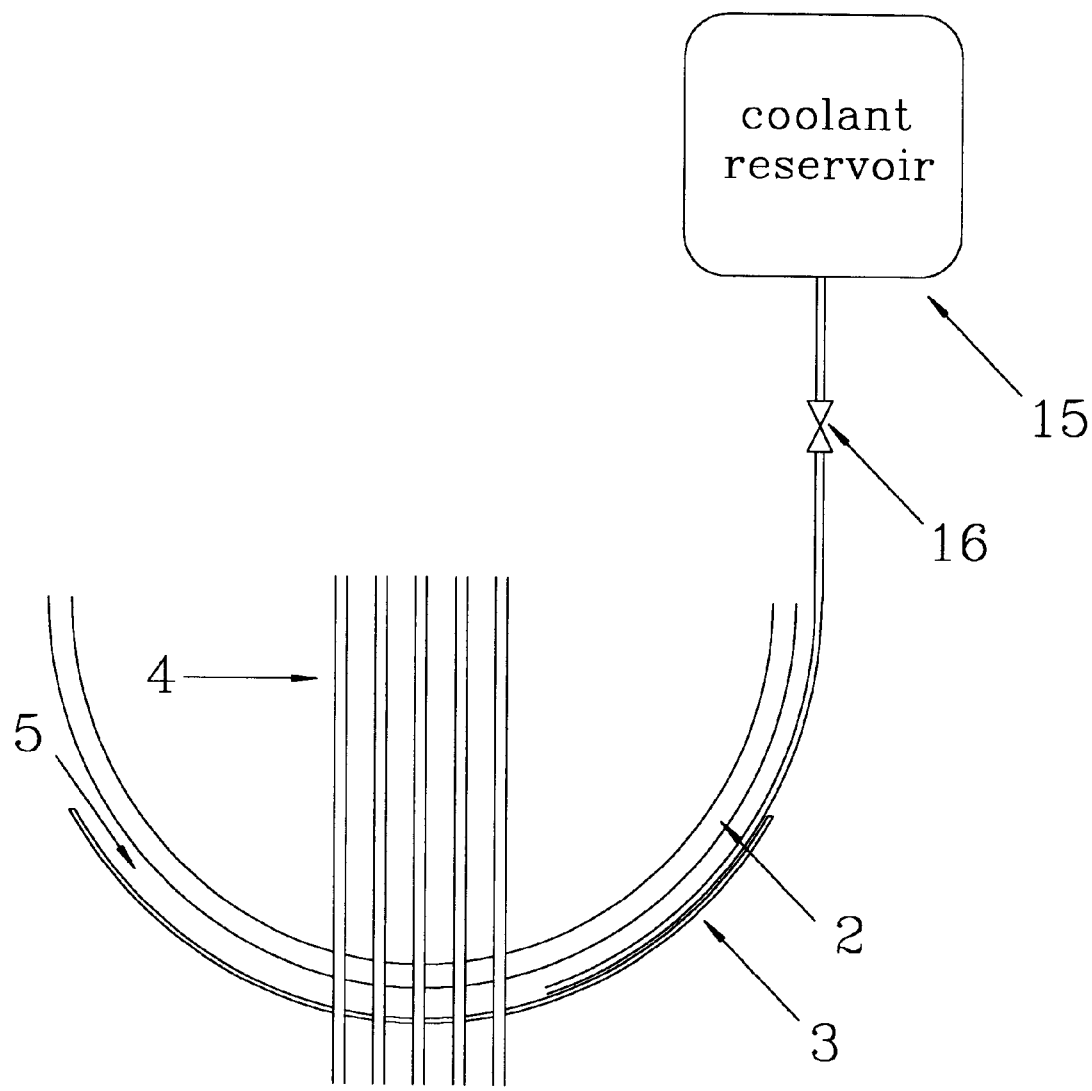
FIG. 7 shows a gap structure positioned outside the reactor vessel lower head according to the present invention.

While FIGS. 1, 2, 3, and 4 show the in-vessel gap structures, FIG. 7 shows an ex-vessel gap structure (3) installed outside the vessel lower head (2). In this case, required coolant would be supplied from a coolant reservoir (15) during the accident via a control valve (16) and coolant feed tube 17. Both in-vessel and ex-vessel gap structures may be installed such that they will not interfere with vessel inspection and maintenance. In the same manner as in the reactor vessel itself, a plurality of ex-vessel gap structures could be utilized (not shown for sake of brevity) if desired.

The external gap forming and retention structure for use with a nuclear reactor vessel having a reactor core assembly positioned above a reactor vessel lower head and with a coolant circulating in the reactor vessel, comprises a concave vessel externally positioned below and spaced apart from the exterior surface of the reactor vessel lower head such that a gap is formed between the exterior surface of the reactor vessel lower head and the concave vessel. A coolant supply means supplies coolant to the gap in the event of a reactor core meltdown to enable removal of heat from the reactor vessel lower head heated by molten core debris from the reactor core assembly in the event of a reactor core meltdown thereby maintaining structural integrity of the reactor vessel lower head during the reception and retention of the molten core debris by the reactor vessel.

Preferably, the coolant supply means further includes a control valve for controlling the rate of coolant flow into the gap. Cooling fins may also be secured to the lower head of the reactor vessel to aid in heat removal by the coolant as it flows in the gap.

Figure 8A:
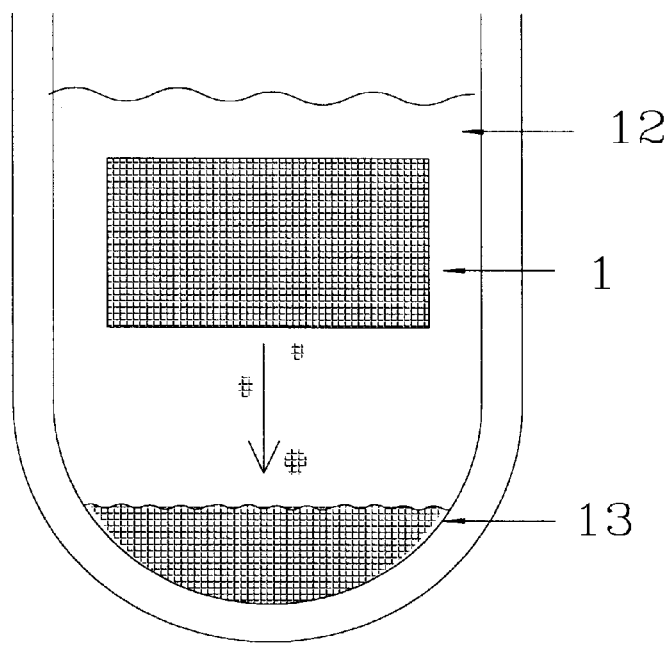
FIGS. 8A and 8B are an illustration of severe accident development in a nuclear reactor without a gap structure.
Figure 8B:
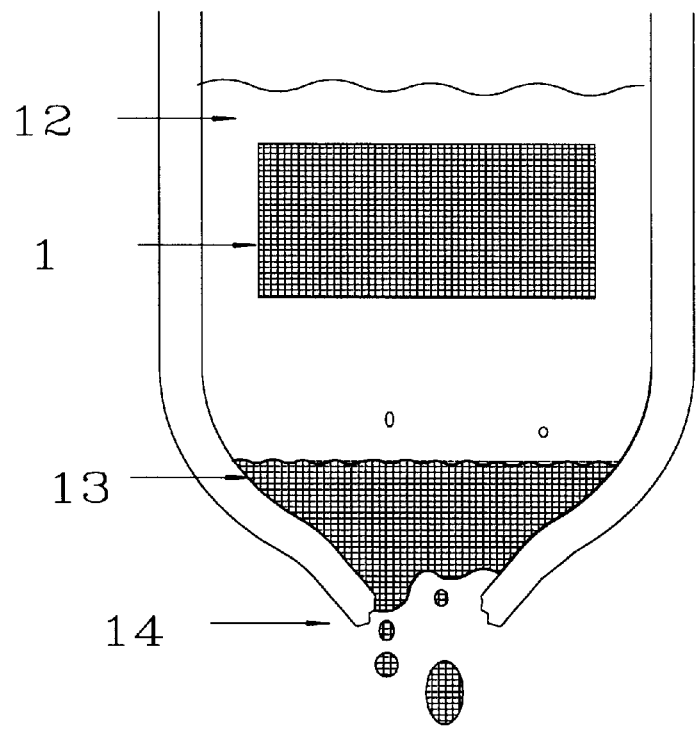
Figure 9A:
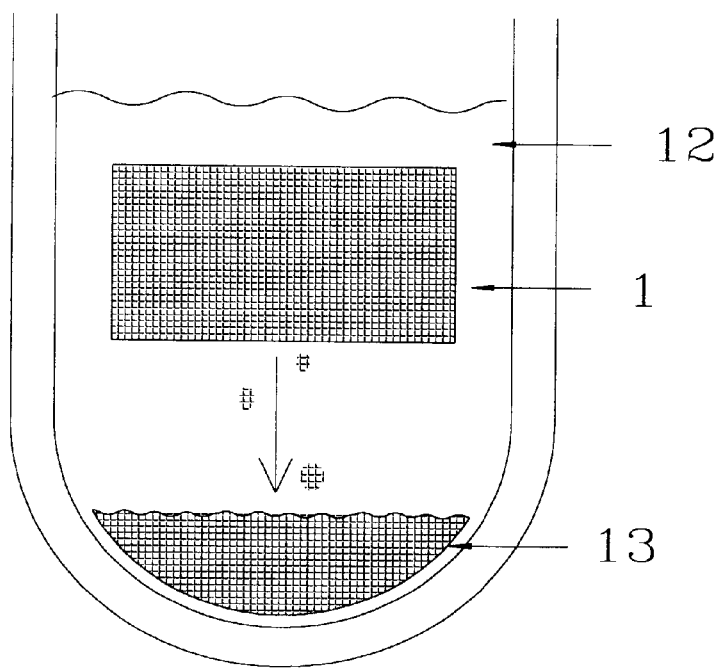
FIGS. 9A and 9B illustrate the arrest of severe accidents in a nuclear reactor with a gap structure according to the present invention.
Figure 9B:
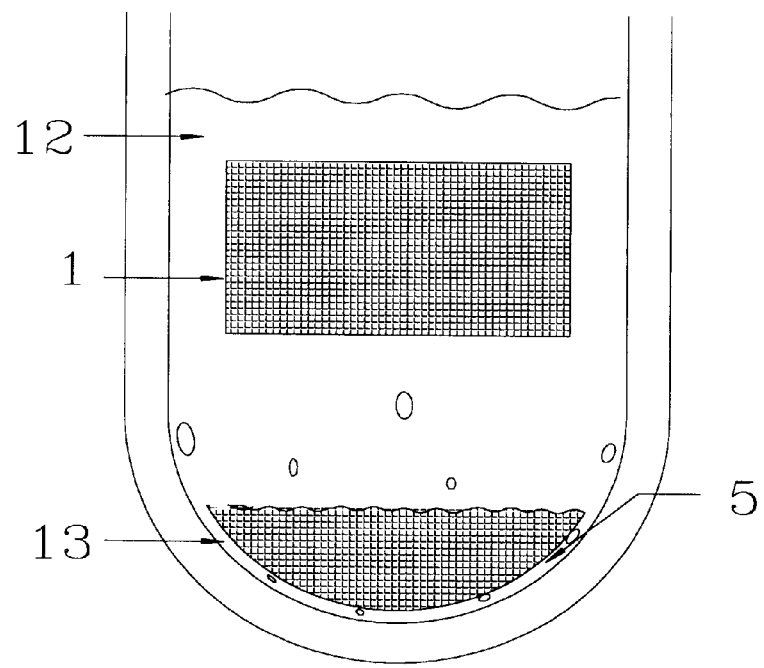
Figure 10A:
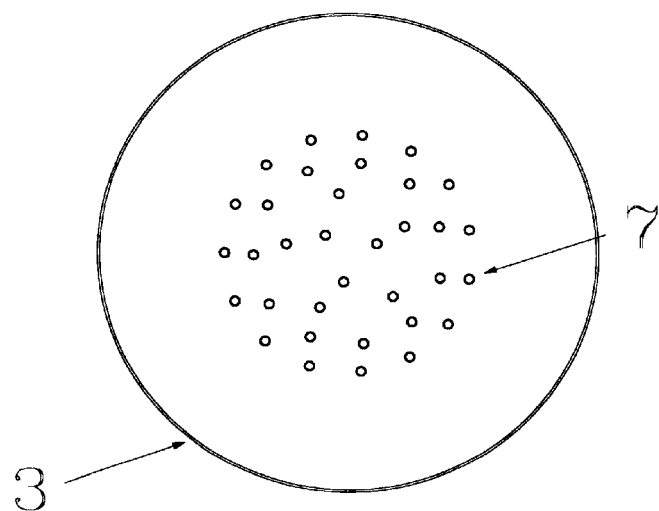
FIGS. 10A, 10B and 10C show a top view, a cross-sectional view and a plan view, respectively, of the gap structure according to the present invention that is applicable for a pressurized water reactor (PWR), a flow-channel type pressurized water reactor (VVER-type), and a boiling water reactor (BWR).
Figure 10B:
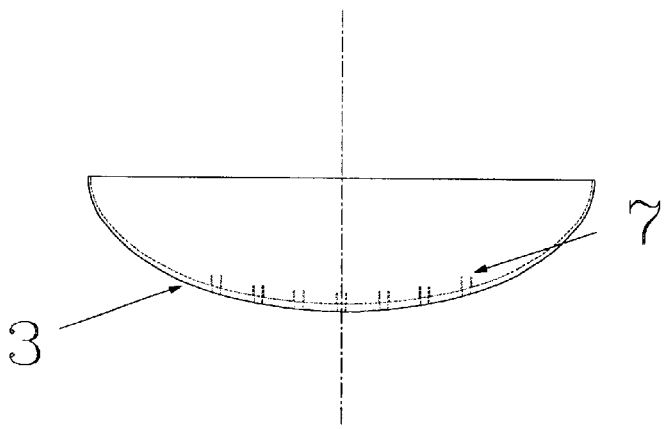
Figure 10C:
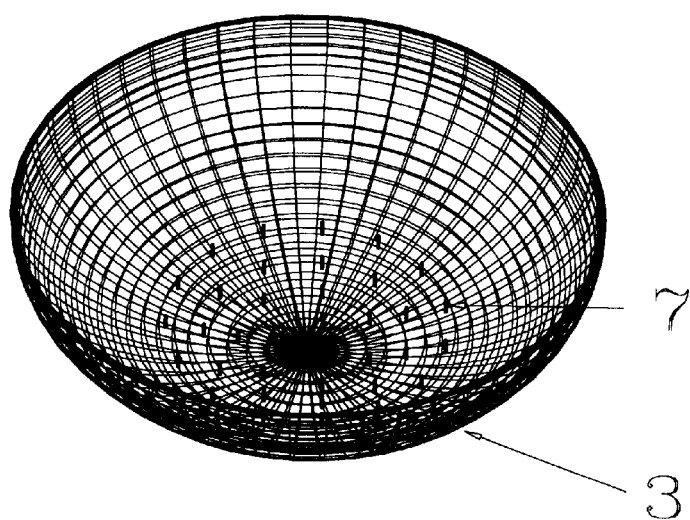
Figure 11A:
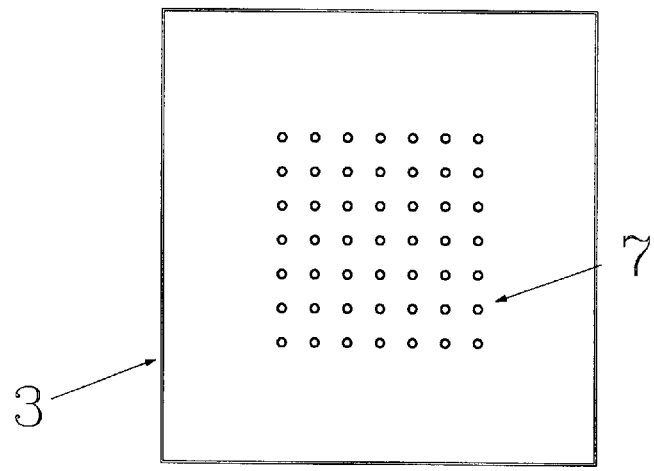
FIGS. 11A, 11B and 11C show a top view, a cross-sectional and a plan view, respectively, of the gap structure according to the present invention that is applicable for a pressurized heavy water reactor (CANDU-type).
Figure 11B:
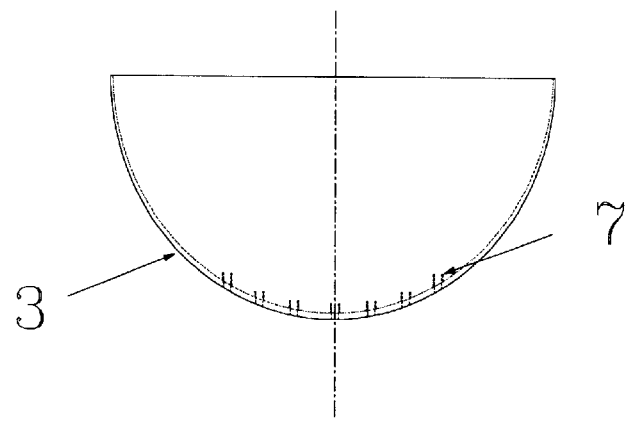
Figure 11C:
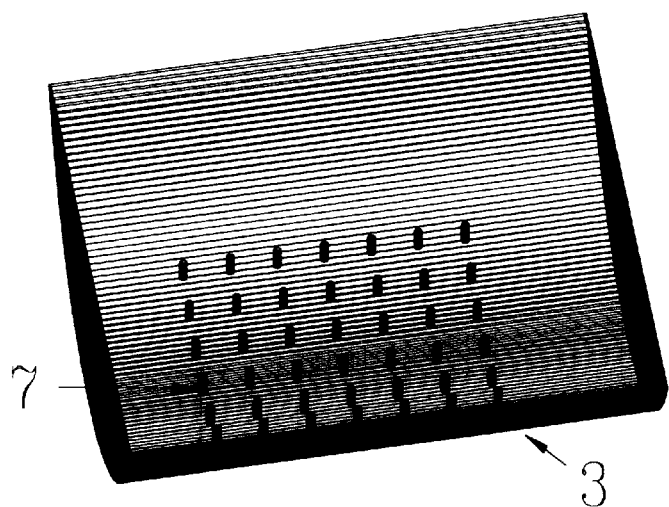

FIG. 8 illustrates severe accident development without the gap structures, while FIG. 9 illustrates the accident arrest with the help of the gap structure according to the present invention. In FIGS. 8 and 9, numbers 12, 13, and 14 represent water coolant (12), molten core debris (13) and failed vessel lower head (14), respectively. FIG. 10(A) shows a top view, FIG. 10(B) shows a cross-sectional view, and FIG. 10(C) shows a plan view of the gap structure (3) which is applicable to PWR, flow-channel type PWR (VVER-type), and BWR. The gap structure plan view of FIG. 10(C), is illustrated with grid lines to enhance three-dimensional display effect. This figure also shows structural guide sleeves (7) for the instrumentation/control penetration. FIG. 11(A) shows a top view, FIG. 11(B) shows a cross-sectional view, and FIG. 11(C) shows a plan view of the gap structure of the present invention (3) which is applicable to a pressurized heavy water reactor (CANDU-type). The plan view, FIG. 11(C), is illustrated with grid lines to enhance three-dimensional display effect. This figure also shows structural guide sleeves (7) for the instrumentation/control penetration. Design of the next generation nuclear reactors is required to have provisions for the protection against severe accidents. Proposed designs for this purpose, in the case of light water reactors, include two main features: namely, reactor cavity flooding method and advanced containment cooling method. These methods of protection against severe accidents would require large and costly facilities. In contrast, the gap structures of this invention provide vessel protection with relatively simple structural installations and can function largely in a passive manner. We have described the gap structure in detail. It is obvious that whoever has ordinary knowledge in this field will be able to easily adapt this invention to various applications. Therefore we want the use of this invention not only in the claimed range but also in the various applications.

What is claimed is:

1. A gap forming and cooling structure for use with a water cooled nuclear reactor vessel having a reactor core assembly positioned above a reactor vessel lower head having an external surface and with a coolant circulating in the reactor vessel, said structure comprising:

a vessel externally positioned below and spaced apart from said external surface of said reactor vessel lower head;

means for spacing apart and maintaining said vessel in a spaced apart condition relative to said external surface of said reactor vessel lower head such that a gap is formed and maintained between said vessel and said external surface of said reactor vessel lower head; and a coolant supply means for supplying coolant to said gap in the event of a reactor core meltdown to enable removal of heat from said reactor vessel lower head heated by molten core debris from said reactor core assembly in the event of a reactor core meltdown thereby maintaining structural integrity of said reactor vessel lower head during the reception and retention of said molten core debris by said reactor vessel.

2. The gap forming and cooling structure of claim 1, wherein said coolant supply means further includes a controlling valve for controlling the rate of coolant flow into said gap.

3. The gap forming and cooling structure of claim 1, wherein said vessel is a concave vessel.

4. The gap forming and cooling structure of claim 3, wherein said means for spacing apart and maintaining said concave vessel in a spaced apart condition relative to said external surface of said reactor vessel lower head further includes a cooling path made by both said concave vessel and reactor vessel lower head wherein coolant inside said concave vessel entirely wets the external surface of said reactor vessel lower head.

5. The gap forming and cooling structure of claim 3, wherein said concave vessel defines a first concave vessel and a second concave vessel, wherein said first concave vessel is spaced apart from said external surface of said reactor vessel lower head to form a first gap and said second concave vessel Is spaced apart from said first concave vessel to form a second gap; and a second coolant supply means for supplying coolant to said second gap in the event of a reactor core meltdown to enable removal of heat from said first concave vessel heated by molten core debris from said reactor core assembly in the event of a reactor core meltdown thereby maintaining structural integrity of said reactor vessel lower head during the reception and retention of said molten core debris by said reactor vessel.

6. The gap forming and cooling structure of claim 3 wherein said a first concave vessel is internally positioned below said reactor core assembly proximate said reactor vessel lower head, and said second concave vessel is spaced apart from said external surface of said reactor vessel lower head.

* * * * *